R. E. HASEMEIER.
SHOCK ABSORBER FOR VEHICLES.
APPLICATION FILED AUG. 24, 1921.
1,424,475.
Patented Aug. 1, 1922.
3 SHEETS—SHEET 1.
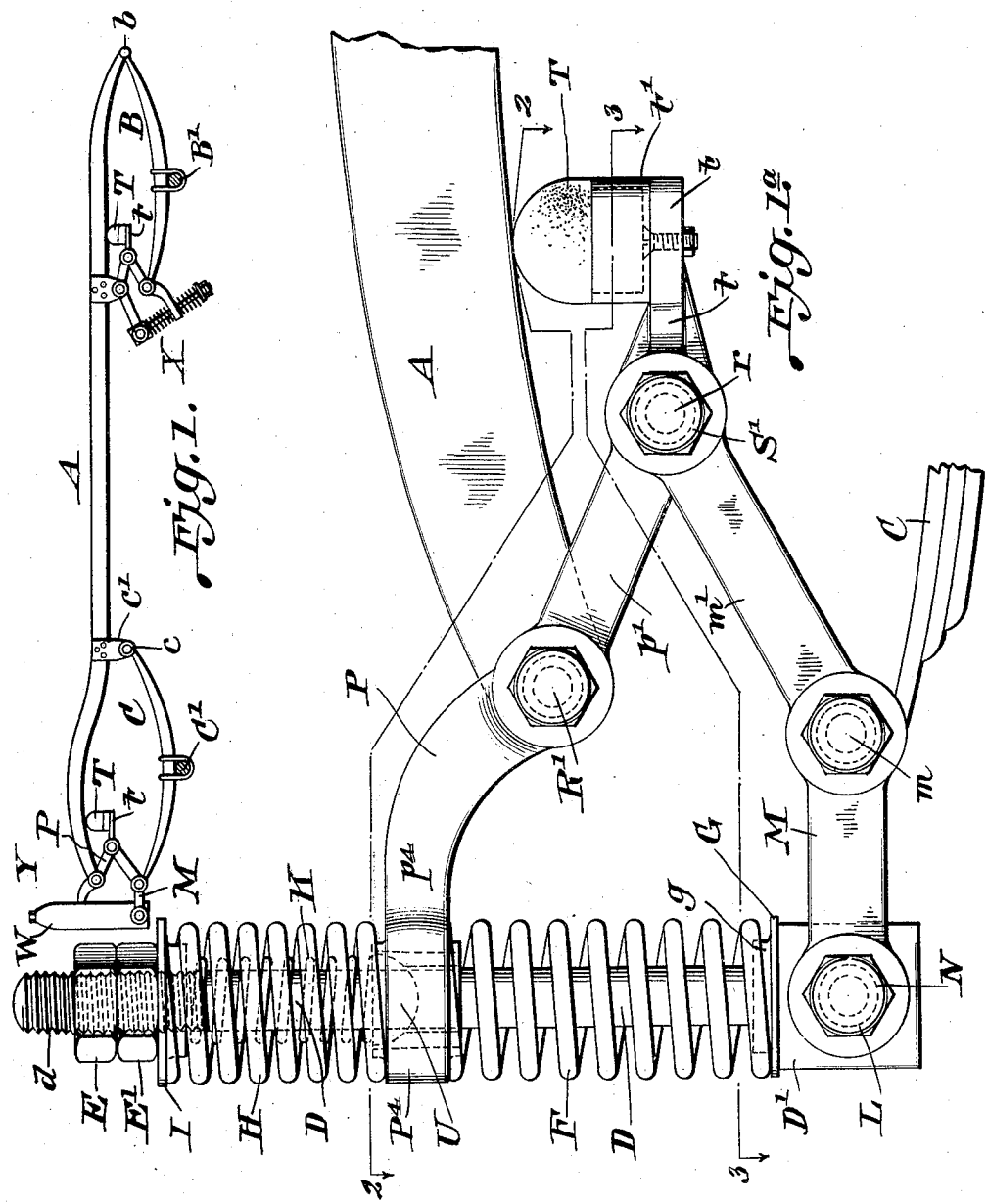
Inventor
Ralph E. Hasemeier
by his Attorneys

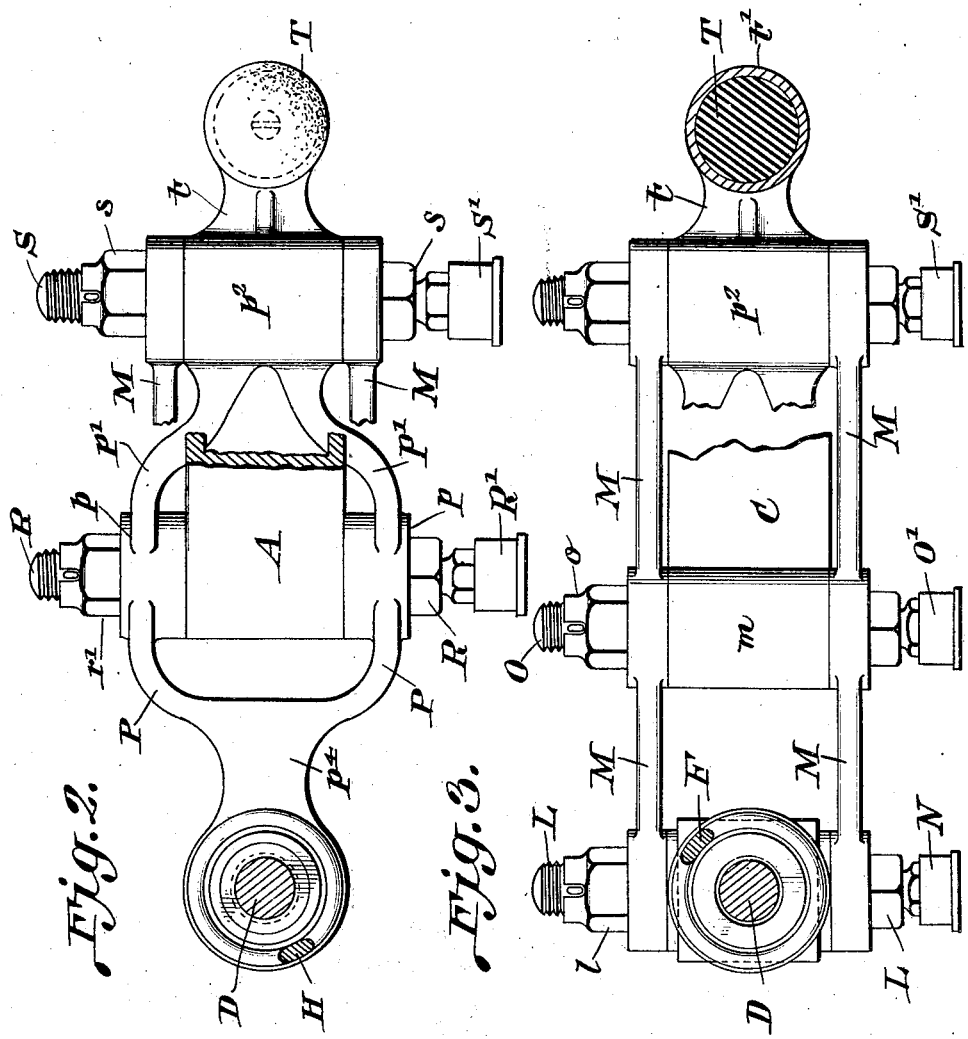

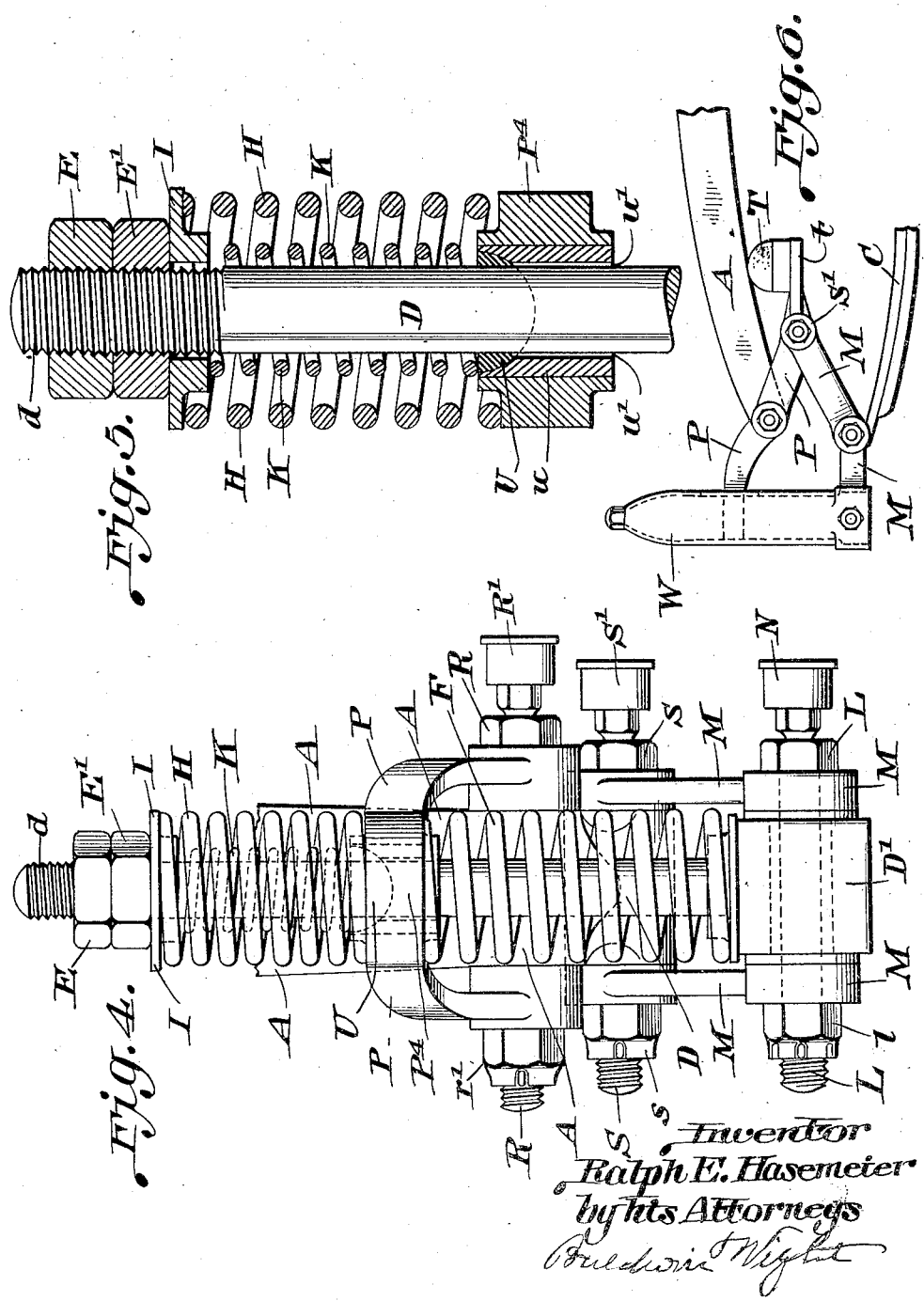

UNITED STATES PATENT OFFICE.

RALPH E. HASEMEIER, OF KOKOMO, INDIANA.

SHOCK ABSORBER FOR VEHICLES.

1,424,475. Specification of Letters Patent. Patented Aug. 1, 1922.

Application filed August 24, 1921. Serial No. 495,067.

*To all whom it may concern:*

Be it known that I, RALPH E. HASEMEIER, a citizen of the United States, residing at Kokomo, in the county of Howard and State of Indiana, have invented certain new and useful Improvements in Shock Absorbers for Vehicles, of which the following is a specification.

This invention relates to devices for absorbing or relieving shocks incident to spring-supported vehicles, such as automobiles in which the vehicle body is supported on springs which in a measure provide easy riding, but which, when the vehicle encounter obstructions in the road, are suddenly compressed or expanded and produce such shocks as to cause discomfort to the occupants of the vehicle.

According to my invention, I associate with the usual vehicle springs yielding devices which to a very great extent relieve such shocks and these devices are simple in construction, reliable in operation and can be easily applied to vehicle-supporting springs of various kinds.

In carrying out my invention I apply my improved shock-absorbing and rebound-preventing devices to the rear ends of the front and rear vehicle-supporting springs. Each of these devices comprises a spring-supporting post carrying upper and lower coiled springs. The post carries at one end nuts by means of which the tension of the springs may be adjusted and the spring-carrying post is supported by levers, one of which is connected with the lower end of the post and the other has an enlarged outer end which is interposed between the two springs. One of the levers is pivotally connected with the chassis or frame of the vehicle and one is pivotally connected with the vehicle-supporting spring with which it is associated and the two levers are pivotally connected with each other. One of the levers carries a buffer which makes contact with the frame of the vehicle. There are certain details of construction preferably employed which will be hereinafter described.

Where the vehicle is mounted on four vehicle-supporting springs there are four shock absorbers employed and the arrangement is such that when obstructions are encountered or when for any other reason the vehicle springs are brought into operation, the shock is absorbed or cushioned by one set of springs while the other springs prevent rebounds. Vibrations and side swaying are eliminated. The springs are always held in place under compression which may be adjusted by the devices employed for that purpose.

My improvements are illustrated in the accompanying drawings, in which

Figure 1 is a side elevation, largely diagrammatic, illustrating how my improved shock absorbers are applied to the front and rear springs of the vehicles;

Figure 1ᵃ is a view on an enlarged scale and in side elevation, more clearly illustrating how the shock absorber is applied to the rear springs and showing more clearly some details of construction;

Figure 2 shows a section of the shock absorber on the line 2—2 of Fig. 1ᵃ;

Figure 3 is a similar view on the line 3—3 of Fig. 1ᵃ;

Figure 4 is a rear elevation of the shock absorber shown in Fig. 1ᵃ;

Figure 5 is a view in vertical section showing certain details of construction;

Figure 6 is a side elevation showing how the springs of the shock absorber may be encased.

In Figure 1, A indicates a part of the chassis or frame of the vehicle. B indicates one of the front vehicle-supporting springs mounted on the axle B'. C indicates one of the rear vehicle-supporting springs mounted on the axle C'. The spring B is hinged to the frame at *b*, its rear end carrying the shock absorber X, which is shown more in detail in other figures of the drawings. The rear spring C is hinged at *c* to a bracket *c'* depending from the frame A. The rear shock absorber is indicated in Fig. 1 at Y. It will be observed that the front and rear shock absorbers are all applied to the rear ends of the vehicle-supporting springs. The shock absorber shown in the remaining figures of the drawings is of the kind applied to the rear spring. Those applied to the front springs are of substantially the same construction but are applied in a little different way, as indicated in Fig. 1.

Each shock absorber comprises a post D, rigidly secured to or formed integral with a base-block D'. This post is threaded at its upper end *d* and carries nuts E, E', which are used for adjusting the tension of the springs carried by the post D. The lower spring F rests on a washer G, supported by the block D'. This washer has a flange g, which extends into the lower coil of the spring F. The post D also carries an upper spring H, the upper end of which enters a recess in a washer I, which is interposed between the upper end of the spring H and the nuts E, E'. There is another spring K, carried by the upper end of the post D and contained within the spring H. This spring K is for a purpose hereinafter described. The block D' has an opening through it, as indicated in Fig. 4, and through this opening extends a bolt L, carrying a castle nut l. Levers M are pivotally connected with the block D' by the bolt L. There are two sets of levers and they are arranged on opposite ends of the block, as shown in Fig. 4. The bolt bearing in the block D' is lubricated by a lubricant supplied by the grease-cup N. These levers M are pivotally connected with the rear end of the spring C at m by a bolt O, carrying a castle nut o and provided with a grease-cup O'. Each of the levers M is extended rearwardly, as indicated at m', and is connected at r with another set of levers P, in this instance arranged above the levers M. The levers P may be formed integrally with each other, as shown in Fig. 2. Said levers are provided with hubs p, through which extends a bolt R, carrying a castle nut r' and a grease-cup R'. This bolt pivotally connects the levers P with the chassis or frame A. The rear arms p' of the levers P are brought together at the rear to form a hub $p^2$, through which extends a bolt S, carrying a castle nut s and provided with a grease-cup S'. This bolt S also extends through the rear ends of the levers M and in this way the upper and lower levers are pivotally connected with each other. The hub $p^2$ is extended or formed with a bracket, as indicated at t, which carries a cup t', which supports a buffer T of rubber or other suitable material, which rests against the frame A, as indicated in the drawings. The front ends of the levers P are brought together, as indicated at $p^4$, and formed with an annular head $P^4$, through which the post D extends. This head is arranged between the springs F and H.

The opening through the head $P^4$ is of considerably larger diameter than that of the post D, and it carries a bushing u of suitable bearing material and the bore through this bushing is of greater diameter than that of the post D, leaving an annular space u', as indicated in Fig. 5. At one end the bushing is formed with a curved seat for a convexed bearing block U which fits loosely on the post D, and this block is held in place by the coiled spring K, which surrounds the post within the spring H and at its lower end bears on the block U. At its upper end the spring K bears against the washer I. By adjusting the nuts E, E', the tension of all the springs F, H and K can be adjusted and put under the desired compression to accommodate varying conditions.

In Fig. 6 I have shown the springs covered by a casing W, by means of which they may be protected, but this feature forms no part of my present invention.

By reference to Fig. 1, it will be seen that the shock absorber is so applied to the rear ends of the rear springs that the vehicle-supporting springs are connected with the blocks D' which support the springs F, while the frame of the vehicle is connected with the levers P, the outer ends of which are interposed between the two springs F and H. The front springs of the vehicle are connected with the levers P, while the vehicle frame is connected with the blocks D'.

Considering the operation of the shock absorbers at the rear end of the vehicle, it will be observed that when an obstruction is encountered the springs F are put under compression and cushion or absorb the shocks, while objectionable rebounds are prevented by the springs H. During such movements of the levers there is a slight tilting movement of the posts D and this is made easy by the bearing blocks U, held in place by the springs K.

It will be observed, by reference to Fig. $1^a$, that the outer ends of the levers M and P are widely separated, while their inner ends are brought together and pivotally connected. This gives a general triangular shape to the lever construction, which is found to be most efficient.

It will be observed that the inner ends m', p', of the levers are so connected with each other that they cannot twist. From this point of connection the levers diverge and their outer ends are connected by the spring-supporting post. Intermediate these ends the levers M and P are connected to the vehicle frame and to the vehicle-supporting springs. This triangular construction gives rigidity against sidewise or swaying movement and relieves the bearings from distortion and wear, as it is obvious that in view of the fact that the outer ends of the levers are connected to the spring-supporting post, such twisting action cannot take place.

It will also be observed that the levers M and P straddle the ends of the frame and the vehicle-supporting spring where they are pivotally connected therewith, and thus leave a clear open space between these points of connection, giving ample room for free movement of the parts.

When the levers are moved during the rebound incident to the operation of the absorber, the buffers T bear against the vehicle frame and the upper levers are held rigidly against movement during the rebound and this checking of the movement of the lever compels the upper spring H to be brought into operation at the proper time.

I claim as my invention:

1. A shock absorber for vehicles comprising a single spring-carrying post, springs mounted thereon, means for adjusting the tension of the springs, a lever connected to one end of the post, a lever having an end interposed between the springs on the post, pivotal connections between the two levers, a pivotal connection between one lever and the vehicle spring, and a pivotal connection between the other lever and the vehicle frame.

2. A shock absorber for vehicles comprising a single spring-carrying post, a plurality of springs thereon, a lever having an end interposed between the springs, another lever having an end arranged at the end of one of the springs, pivotal connections between the two levers a pivotal connection between one lever and the vehicle spring, and a pivotal connection between the other lever and the vehicle frame.

3. A shock absorber for vehicles comprising a spring-carrying post, a plurality of springs thereon, a lever having an end interposed between the springs, another lever having an end arranged at the end of one of the springs, pivotal connections between the two levers, pivotal connections between said levers the vehicle frame and the spring with which the absorber is associated, and a buffer for limiting the movement of the levers.

4. A shock absorber for vehicles comprising a spring-supporting post, a plurality of springs thereon, a lever having an end interposed between the springs, another lever having an end connected with the post at the end of one of the springs, pivotal connections between the levers, a pivotal connection between one of said levers and the vehicle frame, a pivotal connection between the other lever and the vehicle-supporting spring with which the absorber is associated, a bearing-block on the spring-supporting post associated with one of the levers, and a spring for holding the bearing-block in place.

5. A shock absorber for vehicles comprising a spring-supporting post, a plurality of springs mounted thereon, a lever pivotally connected with the lower end of the post, pivotal connections between this lever and the vehicle-supporting spring with which it is associated, another lever pivotally connected with the lever first mentioned, a pivotal connection between this lever and the vehicle frame and an enlargement on said last mentioned lever which surrounds the spring-supporting post and is interposed between the springs thereon.

6. A shock absorber for vehicles comprising a single spring-supporting post, a plurality of springs thereon, a post-supporting lever connected at its outer end with the lower end of the post and having an inclined rear portion, another lever having a part interposed between the springs on the post and having a rear inclined portion pivotally connected with the inclined part of the first-mentioned lever to provide a triangular lever arrangement, a pivotal connection between one of said levers and the vehicle frame, and a pivotal connection between the other lever and the vehicle supporting spring with which the absorber is associated.

7. A shock absorber for vehicles comprising a single spring-carrying post, a plurality of springs thereon, a lever having an end interposed between the springs, another lever having an end arranged at the end of one of the springs, a pivotal connection between the inner ends of said levers where they are brought together to form a triangular construction for the levers, a pivotal connection between one of said levers and the vehicle frame and a pivotal connection between the other lever and the vehicle spring with which the absorber is associated, the organization being such that while freedom of movement vertically is given to the lever structure, sidewise or twisting movement at their point of connection is avoided.

8. A shock absorber for vehicles comprising a spring-carrying post, a plurality of springs thereon, a lever having an end interposed between the springs and having arms extending inwardly, means for pivotally connecting said arms on opposite sides of part of the vehicle, other levers pivotally connected with the post at one end thereof, and pivotal connections between said levers and the part of the vehicle on opposite sides of which said levers are arranged.

9. A shock absorber for vehicles comprising a spring-carrying post, a plurality of springs thereon, a lever having an end interposed between the spring and having portions straddling a part of the vehicle a pivotal connection between said levers and the part of the vehicle thus straddled, other levers pivotally connected with the post and straddling another part of the vehicle, a pivotal connection between said levers and the part of the vehicle last mentioned thus straddled, and a pivotal connection between the inner ends of said levers, the organization being such that maximum freedom of movement is given to the levers between their points of connection with the vehicle.

10. A shock absorber for vehicles comprising a spring-carrying post, springs mounted thereon, a lever connected to one end of the post, a lever having an end interposed between the springs on the post, pivotal connections between the two levers, a pivotal connection between one of said levers and the vehicle frame, a pivotal connection between the other lever and the vehicle spring, and a buffer carried by one of said levers to limit their movement.

11. A shock absorber for vehicles comprising a spring-carrying post, springs mounted thereon, a lever connected to one end of the post, a lever having an end interposed between the springs on the post, pivotal connections between the two levers, a pivotal connection between one of said levers and the vehicle frame, a pivotal connection between the other lever and the vehicle spring, and a buffer carried by the lever which is pivoted to the frame and engaging the frame to limit the movement of the levers.

12. A shock absorber for vehicles comprising a spring-carrying post, springs mounted thereon, a lever connected to one end of the post, a lever having an end interposed between the springs on the post, pivotal connections between the two levers, a pivotal connection between one of said levers and the vehicle frame, a pivotal connection between the other lever and the vehicle spring, an extension on one of said levers, and a buffer carried by said extension and engaging the vehicle frame to limit the movement of the levers.

13. A shock absorber for vehicles comprising a spring supported post, a plurality of springs mounted thereon, a lever having an end surrounding the post intermediate the spring, a bushing for said lever having a concave end, a convex bearing block on the post resting on said bushing, and a spring for holding the bearing block in place, whereby the post and lever may have a limited angular movement relative to each other.

In testimony whereof, I have hereunto subscribed my name.

RALPH E. HASEMEIER.